United States Patent [19]

Badavas et al.

[11] Patent Number: 5,239,456
[45] Date of Patent: Aug. 24, 1993

[54] METHOD AND APPARATUS FOR PROCESS CONTROL WITH OPIMUM SETPOINT DETERMINATION

[75] Inventors: Paul C. Badavas, Southboro, Mass.; Nicolaas E. Hemkes, Soest, Netherlands; Nicholas P. DiVittorio, Attleboro, Mass.

[73] Assignee: The Foxboro Company, Foxboro, Mass.

[21] Appl. No.: 626,575

[22] Filed: Dec. 12, 1990

Related U.S. Application Data

[63] Continuation-in-part of Ser. No. 559,645, Jul. 30, 1990, Pat. No. 5,150,289.

[51] Int. Cl.⁵ ...................... G06F 15/46; G05B 13/02
[52] U.S. Cl. ..................................... 364/154; 364/148
[58] Field of Search ............... 364/148, 152, 153, 154, 364/554, 155

[56] References Cited

U.S. PATENT DOCUMENTS

| | | | |
|---|---|---|---|
| Re. 33,267 | 7/1990 | Kraus | 364/158 |
| 3,515,860 | 6/1970 | Fitzgerald, Jr. | 364/155 |
| 3,867,712 | 2/1975 | Harthill et al. | 340/6 R |
| 3,876,872 | 4/1975 | Spitz | 364/154 |
| 3,961,234 | 6/1976 | Chambers et al. | 318/561 |
| 3,992,616 | 11/1976 | Acker | 235/156 |
| 3,995,478 | 12/1976 | Wilhelm, Jr. | 364/153 |
| 4,186,384 | 1/1980 | Acker | 340/347 AD |
| 4,602,326 | 7/1986 | Kraus | 364/158 |
| 4,855,897 | 8/1989 | Shinskey | 364/148 |
| 5,091,844 | 2/1992 | Waltz | 364/153 |

FOREIGN PATENT DOCUMENTS

| | | |
|---|---|---|
| 0405924 | 6/1989 | European Pat. Off. |
| 932461 | 5/1982 | U.S.S.R. |
| 1012202 | 4/1983 | U.S.S.R. |

OTHER PUBLICATIONS

Shinskey, Process Control Systems, McGraw-Hill, 1988, pp. 150-157.
Shinskey, "How Good are our Controllers in Absolute Performance and Robustness?" Measurement & Control, vol. 23, May 1990, pp. 114-121.
Shinskey, "Putting Controllers to the Test," Chemical Engineering, Dec. 1990, pp. 96-106.
Shinskey, "Absolute Performance and Robustness Measures . . . ," Proceedings: 46 Annual Symposium on Instrumentation . . . , 1991, pp. 55-63.
Shinskey, "Model Predictors: The First Smart Controllers," I&CS/ Sep. 1991, pp. 49-52.
Shinskey, "Evaluating Feedback Controllers Challenges Users and Vendors," Control Engineering, Apr. 1991, pp. 75-78.
Shinskey, "Controlling Temperature in Batch Reactors," INTECH, Apr. 1992, pp. 69-72.
D. L. Ulery, Software Requirements for Statistical Quality Control, Instrument Society of America, International Conference and Exhibit (Oct. 1986).
Badavas et al., Statistical Process Control Embedded in Open Industrial Systems, Instrument Society of America, International Conference and Exhibit (Oct. 1988).
Epperly et al., Statistical Process Control Integrated with Distributed Control Systems, National Petroleum Refiners Association Computer Conference (Oct. 1988).
J. F. MacGregor, On-Line Statistical Process Control, Chemical Engineering Progress (Oct. 1988).
Badavas et al., Meeting the Challenges of the '90's with the Intelligent Automation Series, Foxboro Co., Presentation on the I/A Series as Applied to Paper and Pulp Industry (May 1988).

Primary Examiner—Jerry Smith
Assistant Examiner—Paul Gordon
Attorney, Agent, or Firm—Lahive & Cockfield

[57] ABSTRACT

An improved setpoint control system is disclosed for use in conjunction with process control equipment. The system generates signals representing a statistical characteristic of batches, or subgroups, of monitored values of a controlled variable. From these statistical characteristic signals, the system generates an optimum setpoint signal as a sum of a specification limit and a scaled value of the standard deviation of averages of each of a plurality of batches controlled variable values.

45 Claims, 4 Drawing Sheets

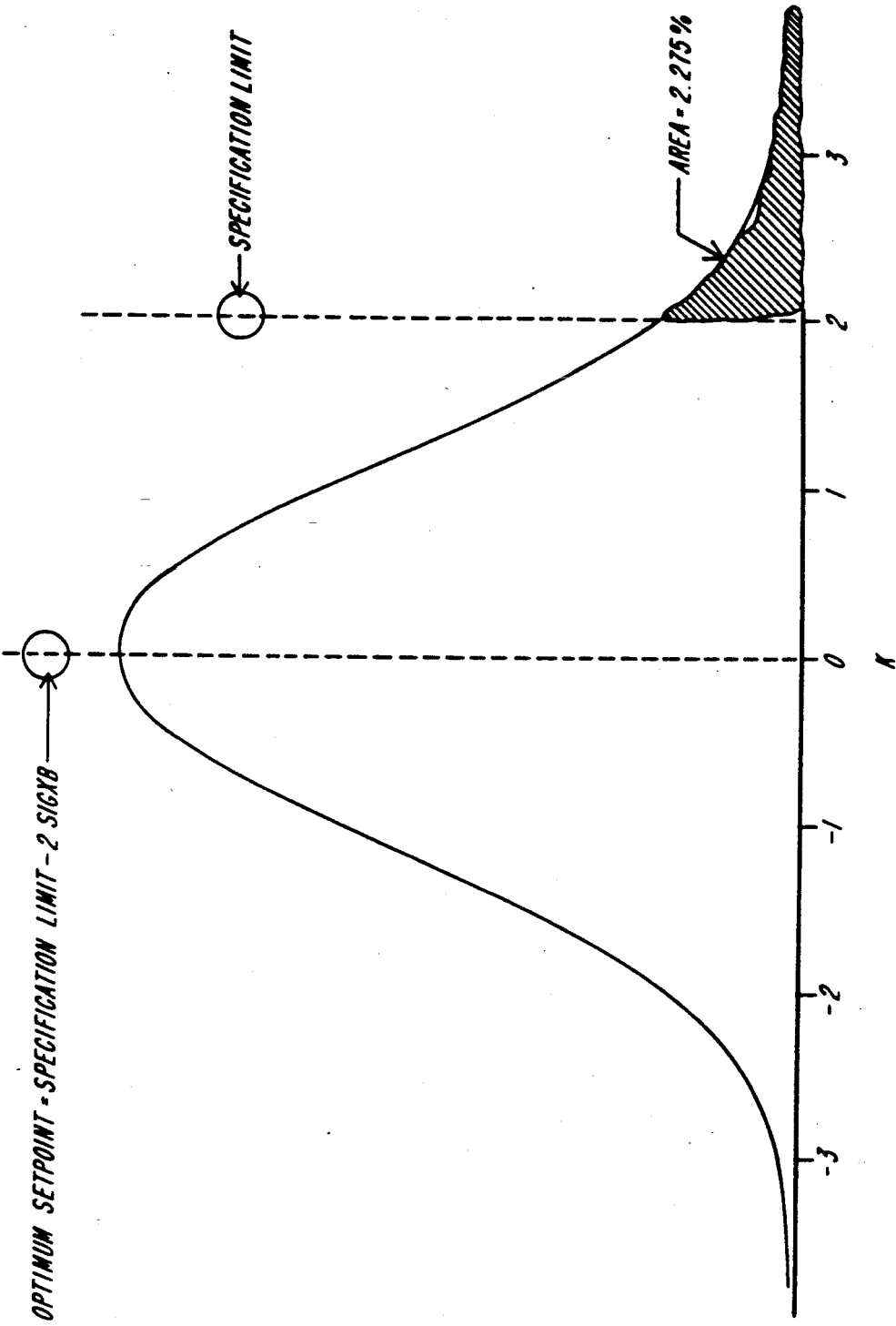

METHOD AND APPARATUS FOR PROCESS CONTROL WITH OPIMUM SETPOINT DETERMINATION

REFERENCE TO RELATED APPLICATIONS

This application is a continuation in part of U.S. patent application Ser. No. 559,645 filed Jul. 30, 1990, now U.S. Pat. No. 5,150,289 for METHOD AND APPARATUS FOR PROCESS CONTROL, assigned to the assignee hereof. The teachings of that application are incorporated herein by reference.

BACKGROUND OF THE INVENTION

This invention relates to process control and, more particularly, to improved methods and apparatus for process control utilizing optimum setpoint determination.

Process control refers to a methodology for controlling the operational parameters of a process by monitoring one or more of its characteristics over time. It is used to ensure that the quality and efficiency of the process do not vary substantially during a single run or over the course of several runs. While process control is typically employed in the manufacturing industry, it also has application in the service industry.

A process control unit, or controller, compares values of a process characteristic, or "controlled variable," with a target value to determine whether the process is operating within acceptable bounds. For example, in a biscuit baking process, a controller compares the moisture of the baked product with a desired moisture content value to determine whether batches of biscuits are properly baked.

If the controller determines that the controlled variable is outside normal bounds, it alerts the operator to the need for corrective action. Alternatively, the controller can initiate corrective action itself by adjusting a parameter, or "manipulated variable," of the process. In the biscuit baking example, if the sample is too moist, the controller can signal an increase in the baking time.

One technique of process control, statistical process control, or SPC, is based on the assumption that, when a process is in control, measured values of the controlled variable will be normally distributed about the target and lie within established limits. When that variable falls significantly outside the expected pattern, the controller takes the corrective action.

A limitation of many prior controllers is that they do not account for process specification limits. These limits, typically expressed in percentages, define how much process output can fall outside a specified limit on one or both sides of a target. For example, in biscuit production, the specification may establish a goal of 15% moisture content, with a limitation that not more than 5% of a batch have a moisture content above 22% or below 10%.

In view of the foregoing, an object of this invention is to provide improved process control apparatus and methods. More particularly, an object of the invention is to provide a method and apparatus for process control with improved setpoint determination.

A further object of the invention is to provide a method and apparatus for optimum setpoint control that utilizes process specification limits in defining an efficient target for process output.

SUMMARY OF THE INVENTION

The invention attains the aforementioned objects by providing a method and apparatus for process control that utilize an optimum setpoint derived from a standard deviation of averages of each of a plurality of batches of controlled variable measurements.

More particularly, the invention provides, in one aspect, a system for controlling equipment of the type that performs a process and that responds to a manipulated variable signal, e.g., one regulating cooking time, to vary a measurable characteristic of the process, e.g., the moisture content of biscuits baked in that oven. The system employs a setpoint controller that measures batches of values of the characteristic and generates a setpoint signal based on the standard deviation of the arithmetic means of those batches. The system further includes a process control unit that responds to a setpoint signal to generate the manipulated variable signal, which can be applied to the process equipment.

According to another aspect of the invention, a setpoint controller generates signals representing a statistical characteristic of the batches of monitored values. In instances where the number of measurements in each batch is less than or equal to ten, the setpoint controller generates a statistical characteristic signal representing a batch range, i.e., the numerical difference between the largest and smallest values in the batch. Where the number of measurement is greater than ten, the setpoint controller generates a statistical characteristic signal representing the variance, or standard deviation, of the batch values.

In further accord with the invention, the setpoint controller generates, from the batch range or batch variance signals, a signal, SIGXB, representing the variance of the averages of a plurality of measured controlled variable batches. Where the number of measurements in the batches is less than or equal to ten, the system generates SIGXB in accord with the mathematical formula $$SIGXB = \frac{RB}{d2 * (n)^{\frac{1}{2}}} \qquad (Eq.\ 1)$$

where,
RB represents a numerical average of said plurality (i.e., ns) of range signals,
d2 represents a Shewhart value corresponding to (n), and
n represents a quantity of said monitored values in each said batch.

Where the number of measured values in the batches are greater than 10, the system generates SIGXB in accord with the mathematical formula $$SIGXB = \frac{SB}{c2 * (n)^{\frac{1}{2}} * (n/(n-1))^{\frac{1}{2}}} \qquad (Eq.\ 2)$$

where,
SB represents a numerical average of said (ns) batch-variance signals,
c2 represents a Shewhart value corresponding to (n), and
n represents a quantity of said monitored values in each said batch.

According to further aspects of the invention, the system generates an optimum setpoint signal by scaling SIGXB and by adding it to a specification limit. Both the scale factor and the specification limit can be specified by the operator via, for example, a console.

Yet another aspect of the invention provides a system for process control, as described above, in which an optimum setpoint controller forms subgroups from (n) consecutive samples of the controlled variable. The system can form successive batches every (n) samples, where (n) is an integer greater than one. Alternatively, the system can form batches of size (n) every (n+m) samples, where both (n) and (m) are integers greater than or equal to one.

According to still other aspects of the invention, it provides a process control system that includes a setpoint controller that monitors the normality of the batches of controlled variable values, e.g., by determining their skewness or kurtosis, and signals the operator in the event that those normality measurements fall outside acceptable bounds.

These and other aspects of the invention are evident in the attached drawings and in the description which follows.

BRIEF DESCRIPTION OF THE DRAWINGS

A more complete understanding of the invention may be attained by reference to the attached drawings, in which:

FIG. 4 depicts a relationship between a specification limit, an optimum setpoint and a scale factor, K, for explanatory purposes in conjunction with a process control system according to the invention.

DETAILED DESCRIPTION OF THE ILLUSTRATED EMBODIMENT

Figure 1:
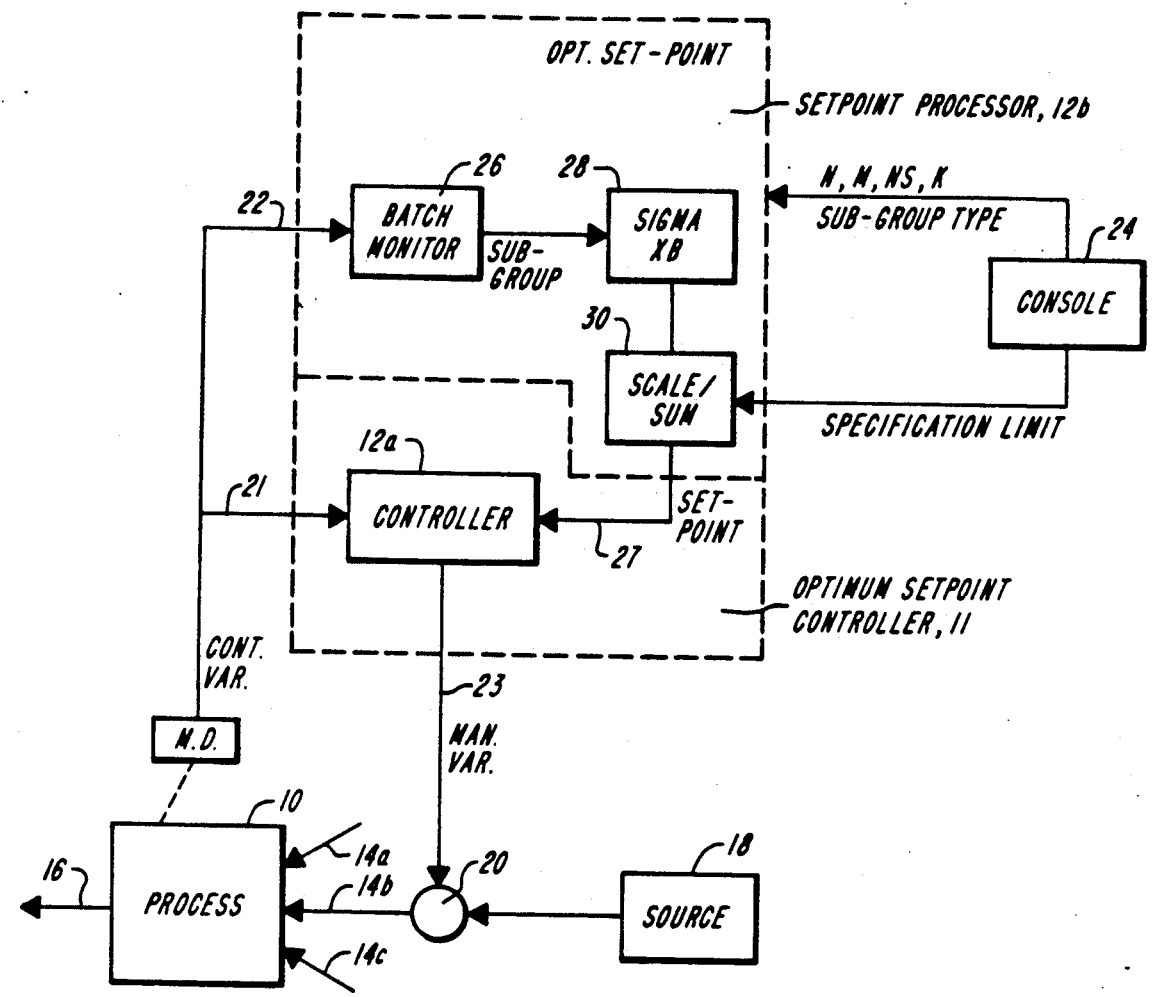
FIG. 1 is a block schematic drawing of an exemplary process control system according to a preferred practice of the invention.

FIG. 1 depicts an exemplary process 10 under the control of an optimum setpoint controller 11 that includes a process controller 12a and setpoint processor 12b according to a preferred practice of the invention. The process 10 represents a conventional manufacturing or service process that utilizes multiple input values on lines 14a, 14b, 14c to produce an output value on line 16. For example, the process 10 can be a biscuit baking process in which flour, water, and sugar are supplied along input lines 14a, 14b, and 14c, respectively, to produce a dough 16.

As illustrated, a source 18 supplies one of the process inputs 14b. In the above example, the source 18 can be a tank supplying purified water. The output of the source 18 is regulated by the controller 12a via a regulator 20. The regulator can, for example, be a conventional flow valve that responds to a manipulated variable signal received on line 23 to control the quantity of material input to the process 10 from the source 18.

In operation, a conventional measuring device, designated MD, measures a characteristic, i.e., a controlled variable, of the process 10. For example, the measuring device can be a moisture sensor arranged to generate a signal representative of moisture content of the dough 16.

The controlled variable signal is routed to the controller 12a via a line 21 from the measuring device. The controller 12a, in turn, produces a manipulated variable output signal based on measured values of the controlled signal, as well as on the setpoint signal received on a line 27 from the setpoint processor 12b. As discussed in further detail below, the value of the setpoint signal is based on the standard deviation of averages of each of a plurality of batches, or subgroups, of the controlled variable.

An illustrated operator console 24 provides further input to the setpoint processor 12b. These inputs can include a signal representative of a number of subgroups, (ns); a signal representative of a subgroup type, e.g., consecutive subgroups of size (n), or subgroups of size (n) formed every (n+m) intervals; signals representative of (n) and (m); a signal representative of a scaling factor (K); and signals representative of process specification limit.

As further shown in FIG. 1, the setpoint processor 12b includes a batch monitor 26 that generates a signal representing a statistical characteristic of batches of the controlled variable. This characteristic can be, for example, an arithmetic mean of the deviation (the dispersion) or an arithmetic mean of the range.

The setpoint processor 12b further includes a computational element 28 that generates from the statistical characteristic a signal, SIGXB, representing a standard deviation of the arithmetic means of (ns) batches of monitored controlled variable values.

The illustrated optimum setpoint processor 12b includes a scaling and summing element 30 that generates an optimum setpoint signal, OSPT, by summing an operator-selected specification limit with a scaled variance signal, representing the multiplicative product of SIGXB and a selected scaling factor.

Figure 2:
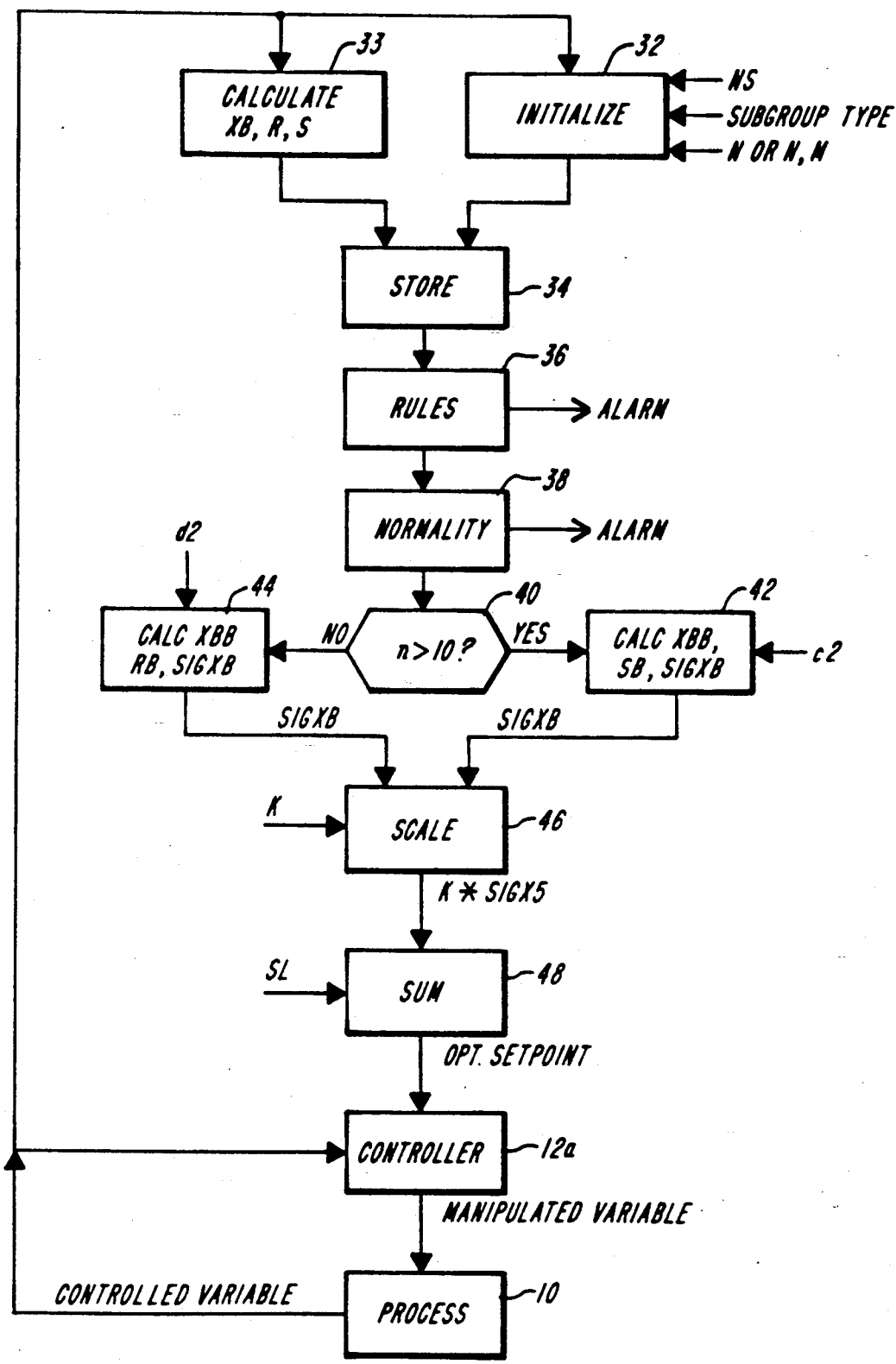
FIG. 2 depicts operation of setpoint control according to a preferred practice of the invention.

The operation of a preferred setpoint processor 12b according to the invention is shown in FIG. 2. There, in step 32, the setpoint processor 12b is initialized by input of a signal, (ns), representing the number of subgroups upon which setpoint computation is to be based; a signal, (n), representing the size of each subgroup; a signal, (m), representing a skip interval; and a signal representative of subgroup type, i.e., whether batches are to be formed from consecutive groups of (n) measured values, or from groups of (n) consecutive values taken every (n+m) values.

During the initialization step 32, the setpoint processor 12b forms subgroups from batches of monitored values of the controlled variable, X. Preferably, for example, the setpoint processor 12b samples the controlled variable every T seconds, where T is defined by default or by the operator, to generate an array of (ns) subgroups each of size (n). That array is represented as follows:

$$X(i) = X(1), \ldots, X(n*ns) \qquad \text{(Eq. 3)}$$

From the values in the array X(i), the setpoint processor 12b generates an array, XB(j), storing the mean value of each subgroup, as follows:

$$XB(j) = \frac{\sum_{i=1}^{n} X(i)}{n} \quad j = 1, \ldots, ns \qquad \text{(Eq. 4)}$$

The setpoint processor 12b also generates, in step 32, an array, R(j), storing the numerical range of each subgroup, that is, the numerical difference between the highest and the lowest sampled values in each subgroup:

$$R(j) = XMAX(j) - XMIN(j) \quad j = 1, \ldots, ns \quad \text{(Eq. 5)}$$

XMAX(j) represents the numerically highest sampled value in subgroup (j), and

XMIN(j) represents the numerically lowest sampled value in subgroup(j).

In the initialization step 32, the process further generates an array, S(j), storing the current standard deviation of each subgroup:

$$S(j) = SQRT\left(\frac{\sum_{i=1}^{n}[X(i) - XB(j)]^2}{n-1}\right) \quad j = 1, \ldots, ns \quad \text{(Eq. 6)}$$

where

SQRT represents a conventional square-root function.

Following initialization, the setpoint processor 12b continues to sample the controlled variable and every time a new subgroup is completed it generates signals representative of the statistical characteristics of each batch of that variable.

Particularly, in step 33, the process generates further mean, range and standard deviations signals, XB(j), R(j) and S(j), respectively, in the manner discussed above. Upon generation of each new signal, the oldest signals in each array, i.e., XB(1), R(1) and S(1), is discarded and each element in arrays XB(j), R(j) and S(j) is replaced with a later-generated value. The most recently generated signals are stored in XB(ns), R(ns) and S(ns).

Step 34 indicates the step of storing the batch characteristic values in arrays XB(j), R(j) and S(j).

In step 36, the setpoint processor 12b optionally checks for abnormal conditions in one or more of the arithmetic means of the most recent subgroups. In the event of abnormality, the process preferably, but not necessarily, diverts flow to step 33 and signals an operator alert. Abnormal conditions are discussed in further detail below.

In step 38, the setpoint processor 12b also optionally checks the normality of the controlled variable subgroups. Particularly, the setpoint processor 12b determines the skewness, kurtosis or other known normality measure of the subgroups. If these normality measures fall outside an acceptable range, the setpoint processor 12b may divert flow to step 33 and signals an operator alert.

In step 40, the setpoint processor 12b diverts flow to either of steps 42 and 44, depending upon the number of monitored values in each subgroup. If that number, (n), is greater than ten, process flow diverts to step 42; otherwise, it diverts to step 44.

In step 42, the setpoint processor 12b generates a signal, XBB, representing the arithmetic mean of the means of (ns) subgroups, in accord with the following equation:

$$XBB = \frac{\sum_{j=1}^{ns} XB(j)}{ns} \quad \text{(Eq. 7)}$$

The setpoint processor 12b also generates a signal, SB, representing the arithmetic mean of the standard deviations of those (ns) subgroups:

$$SB = \frac{\sum_{j=1}^{ns} S(j)}{ns} \quad \text{(Eq. 8)}$$

In step 42, the setpoint processor 12b generates further a signal, SIGXB, representing the standard deviation of the arithmetic means of the (ns) subgroups. The value of this signal is preferably estimated by Shewhart Method 2, as follows:

$$SIGXB = \frac{SB}{c2 \cdot (n)^{\frac{1}{2}} \cdot (n/(n-1))^{\frac{1}{2}}} \quad \text{(Eq. 9)}$$

where

SIGXB represents a value of said SIGXB signal,

SB represents a numerical average of said (ns) batch-variance signals, c2 represents a Shewhart value corresponding to (n), and n represents a quantity of the monitored values in each such batch.

The parameter (c2), which is preferably stored in a memory array for on-line access, has a value dependent upon (n). Values for (c2) are known in the art; see, for example, Grant et al, *Statistical Quality Control.* 5th Edition, (McGraw-Hill, 1980), at Appendix 3, Table B. Values for (c2), excerpted from that publication, are provided in Attachment A, filed herewith.

In alternative step 44, the setpoint processor 12b generates the signal, XBB, representing the arithmetic mean of the means of (ns) subgroups, in the manner discussed above.

In that step, the setpoint processor 12b also generates a signal, RB, representing the arithmetic mean of the arithmetic ranges of those (ns) subgroups, in accord with the following equation:

$$RB = \frac{\sum_{j=1}^{ns} R(j)}{ns} \quad \text{(Eq. 10)}$$

In step 44, the setpoint processor 12b generates a further signal, SIGXB, representing the standard deviation of the arithmetic means of the (ns) subgroups. This value is preferably estimated by Shewhart Method 1, as follows:

$$SIGXB = \frac{RB}{d2 \cdot (n)^{\frac{1}{2}}} \quad \text{(Eq. 11)}$$

where,

SIGXB represents a value of said SIGXB signal,

RB represents a numerical average of said plurality (ns) of range signals, d2 represents a Shewhart value corresponding to (ns), and n represents a quantity of said monitored values in each said batch.

The parameter (d2), which is preferably stored in a memory array for on-line access, has a value dependent upon (n). Values for (d2) are known in the art; see, for example, Grant et al, supra. Values for (d2), excerpted from the cited publication, are provided in Attachment A, filed herewith.

In step 46, the setpoint processor 12b scales SIGXB, multiplying it by a scale factor (K). The value of K is positive when the process 10 approaches the specification limit from above. Conversely, (K) is negative when the process 10 approaches the specification limit from below.

The parameter K is set by the operator in accord with the percentage of the process output which is allowed to fall outside the specification. Referring to the normal distribution curve shown in FIG. 4, if the operator desires, for example, that not more than 2.275% of the output be above the specification limit, (K) is set equal to negative two. Likewise, if the operator desires that not more than 15.865% of the output fall above the specification limit, (K) is set equal to negative one. Furthermore, if the operator desires that not more than 0.135% of the output fall above the specification limit, (K) is set equal to negative three.

In step 48, the setpoint processor 12b generates a signal representative of the optimum setpoint, OSPT, as follows:

$$OSPT = SL + (K \cdot SIGXB) \qquad \text{(Eq. 12)}$$

The specification limit is typically input by the operator via console 24 but may also be computed automatically.

Upon generating OSPT, the setpoint processor 12b provides it to the controller 12a which, in turn, generates a manipulated variable signal for application to the process 10. The controller 12a can be selected from the variety of available controllers, e.g., a proportional integral controller of the type disclosed in Shinskey, *Process Control Systems*, 3rd. Ed. (McGraw-Hill, 1988), or any other type of controller that utilizes an optimum setpoint. Another example of controller 12a is disclosed in the aforementioned related U.S. patent application Ser. No. 559,645, filed Jul. 30, 1990.

Referring to optional step 36, a violation of one or more of the conditions below indicates a potential abnormality. As noted above, in the event of such an abnormal condition, setpoint processor 12b operation can be diverted from step 36 to step 33 and an operator alert can be signalled. The abnormal conditions of the illustrated embodiment can include:

i) the most recent value of the batch-mean signal XB(j) is
   a) greater than a value of the XBB signal plus three times a value of the SIGXB signal, or
   b) less than a value of the XBB signal minus three times a value of the SIGXB signal,
ii) starting with the most recent values of each of three consecutive the batch-mean signals, XB(j), vary from one another in either direction by an amount equal to or greater than a value of three times a value of the SIGXB signal,
iii) starting with the most recent values of two of three consecutive the batch-mean signals, XB(j), are
   a) greater than a value of the XBB signal plus two times value of the SIGXB signal,
   b) less than a value of the XBB signal minus two times a value of the SIGXB signal,
iv) starting with the most recent values of four of five consecutive the batch-mean signals, XB(j), are
   a) greater than a value of the XBB signal plus the value of the SIGXB signal,
   b) less than a value of the XBB signal minus the value of the SIGXB signal,
v) starting with the most recent values of eight consecutive batch-mean signals, XB(j), are greater than a value of the XBB signal,
vi) starting with the most recent values of eight consecutive batch-mean signals, XB(j), are less than a value of the XBB signal,
vii) starting with the most recent values of five consecutive batch-mean signals, XB(j), are of increasing value,
viii) starting with the most recent values of five consecutive batch-mean signals, XB(j), are of decreasing increasing value,
ix) starting with the most recent values of fifteen consecutive batch-mean signals, XB(j), are
   a) less than a value of the XBB signal plus the value of the SIGXB signal, and
   b) less than a value of the XBB signal minus the value of the SIGXB signal,
x) starting with the most recent values of eight consecutive batch-mean signals, XB(j), are
   a) greater than a value of the XBB signal plus the value of the SIGXB signal,
   b) less than a value of the XBB signal minus the value of the SIGXB signal,
xi) starting with the most recent value, after a value of a first batch-mean signal, XB(j), that varies from the previous XB signal, in either direction, by an amount greater than three times the value of the SIGXB signal, then values of three consecutive batch-mean signals, XB(j), are compared to check if they are
   a) greater than 0.75 times a value of the SIGXB signal minus a value of the previous batch-mean signal, and
   b) less than 0.75 times a value of the SIGXB signal plus a value of the previous first batch-mean signal.

Figure 3:
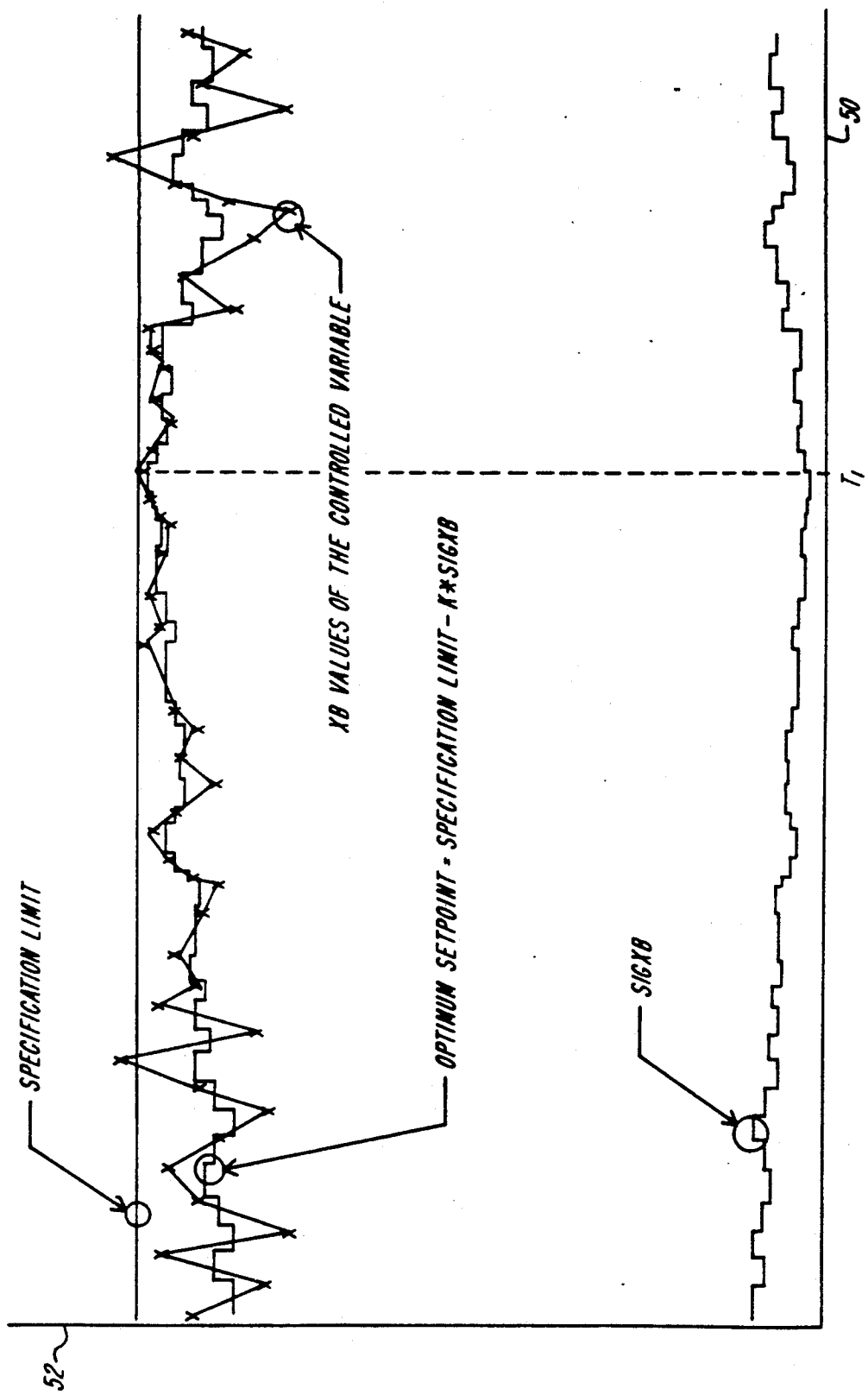
FIG. 3 is a graph depicting exemplary values of signals generated by a setpoint control according to the embodiment of the invention shown in FIG. 2.

FIG. 3 is a graph depicting exemplary timewise trends in values of signals produced in an optimum setpoint processor 12b according to the invention. The x-axis 50 depicts the subgroup number, which corresponds to time, represented by the variable (j), above. The y-axis 52 depicts values of the specification limit, SL, the subgroup mean, XB, the optimum setpoint signal, OSTP, and the subgroup mean standard deviation SIGXB.

In the illustrated graph of FIG. 3, the variations between subgroup means, XB, initially, are large, as is the subgroup mean standard deviation, SIGXB. As the setpoint processor 12b adjusts the setpoint, the variation in XB decreases. Likewise, SIGXB tends toward zero. This adjustment process reaches maximal effectiveness by time T1.

At time T1, a perturbation in the process increases variation in XB and, likewise, increases, SIGXB. In the ensuing time period, the setpoint processor 12b readjusts the setpoint and, thereby, begins minimizing variation in XB and decreasing SIGXB.

It will thus be seen that the invention provides an improved process control system that features optimum setpoint control. The setpoint controller generates signals representing a statistical characteristic of batches, or subgroups, of monitored values of a controlled variable. From these statistical characteristic signals, the controller generates an optimum setpoint signal as a sum of a setpoint limit and a scaled value of the standard deviation of averages of a plurality of batches of controlled variable values. The controller permits operator customization through specification of subgroup size, or subgroup type, as well as specification of the number of subgroups used for subgroup trend identification, e.g., the variable (ns).

Those skilled in the art will appreciate that the embodiment described above is exemplary only, and that other embodiments incorporating the teachings herein are within the scope of the claimed invention. Thus, for example, an optimum setpoint controller in accord with the invention can generate a setpoint based on a plurality of controlled variable signals. Further, for example, the controller can read subgroup size, subgroup type, and subgroup trend identification numbers from memory banks, in lieu of inputting those signals from the operator.

APPENDIX A

Factors for Estimating SIGXB

| subgroup size n | d2 | c2 |
|---|---|---|
| 2 | 1.128 | 0.5642 |
| 3 | 1.693 | 0.7236 |
| 4 | 2.059 | 0.7979 |
| 5 | 2.326 | 0.8407 |
| 6 | 2.534 | 0.8686 |
| 7 | 2.704 | 0.8882 |
| 8 | 2.847 | 0.9027 |
| 9 | 2.970 | 0.9139 |
| 10 | 3.078 | 0.9227 |
| 11 | 3.173 | 0.9300 |
| 12 | 3.258 | 0.9359 |
| 13 | 3.336 | 0.9410 |
| 14 | 3.407 | 0.9453 |
| 15 | 3.472 | 0.9490 |
| 16 | 3.532 | 0.9523 |
| 17 | 3.588 | 0.9551 |
| 18 | 3.640 | 0.9576 |
| 19 | 3.689 | 0.9599 |
| 20 | 3.735 | 0.9619 |
| 21 | 3.778 | 0.9638 |
| 22 | 3.819 | 0.9655 |
| 23 | 3.858 | 0.9670 |
| 24 | 3.895 | 0.9684 |
| 25 | 3.931 | 0.9696 |
| 30 | 4.086 | 0.9748 |
| 35 | 4.213 | 0.9784 |
| 40 | 4.322 | 0.9811 |
| 45 | 4.415 | 0.9832 |
| 50 | 4.498 | 0.9849 |
| 55 | 4.572 | 0.9863 |
| 60 | 4.639 | 0.9874 |
| 65 | 4.699 | 0.9884 |
| 70 | 4.755 | 0.9892 |
| 75 | 4.806 | 0.9900 |
| 80 | 4.854 | 0.9906 |
| 85 | 4.898 | 0.9912 |
| 90 | 4.939 | 0.9916 |
| 95 | 4.978 | 0.9921 |
| 100 | 5.015 | 0.9925 |
| >100 | 5.015 | 0.9925 |

In view of the foregoing, what is claimed as new and secured by Letters Patent is:

1. An apparatus for controlling a process performed with equipment that responds to a manipulated variable signal to vary a characteristic of that process, comprising
   A. means for monitoring values of said characteristic of said process to generate a controlled variable signal representative thereof,
   B. optimum setpoint means coupled to said monitoring mean for generating at least one setpoint signal representative of a desired setting of said process-performing equipment,
   C. said optimum setpoint means including means for generating each said setpoint signal in accord with a value of a standard deviation of arithmetic means of (ns) batches of said monitored process characteristic values identified by said controlled variable signal, where each said batch includes a plurality of monitored values, and where (ns) is an integer greater than one and
   D. controller means, coupled to said optimum setpoint means, for responding to said setpoint signal for generating said manipulated variable signal for application to said process-performing equipment.

2. An apparatus according to claim 1, wherein said optimum setpoint means comprises
   A. batch-characteristic means for generating a statistical-characteristic signal representative of a statistical characteristic of each said batch of monitored values, and
   B. SIGXB means, coupled to said batch-characteristic means, for responding to statistical-characteristic signals of (ns) said batches of monitored values to generate a SIGXB signal representative of a standard deviation of arithmetic means of those (ns) batches.

3. An apparatus according to claim 2, wherein
   A. said batch-characteristic means comprises batch-range means for generating a batch-range signal representative of an arithmetic difference between a numerically minimum monitored value in each said batch of monitored values and a numerically maximum monitored value in that same batch, and
   B. said SIGXB means includes first generating means responsive to (ns) ones of said batch-range signals for generating said SIGXB signal.

4. An apparatus according to claim 3, wherein said first generating means includes means for generating said SIGXB signal in accord with the mathematical formula $$SIGXB = \frac{RB}{d2 * (n)^{\frac{1}{2}}}$$

where,
SIGXB represents a value of said SIGXB signal,
RB represents a numerical average of said plurality (ns) of range signals,
d2 represents a Shewhart value corresponding to (ns), and
n represents a quantity of said monitored values in each said batch.

5. An apparatus according to claim 2, wherein
   A. said batch-characteristic means comprises batch-variance means for generating a batch-variance signal representative of a standard deviation of values in each said batch of monitored values, and
   B. said SIGXB means includes second generating means responsive to (ns) ones of said batch-variance signals for generating said SIGXB signal.

6. An apparatus according to claim 5, wherein said second generating means includes means for generating said SIGXB signal in accord with the mathematical expression $$SIGXB = \frac{SB}{c2 * (n)^{\frac{1}{2}} * (n/(n-1))^{\frac{1}{2}}}$$

where,
SIGXB represents a value of said SIGXB signal,

SB represents a numerical average of said (ns) batch-variance signals, c2 represents a Shewhart value corresponding to (n), and n represents a quantity of said monitored values in each said batch.

7. An apparatus according to claim 2, wherein

A. said batch-characteristic means comprises batch-variance means for selectively generating a batch-variance signal representative of a standard deviation of values in each said batch of monitored values, B. said batch-characteristic means comprises batch-range means for selectively generating a batch-range signal representative of an arithmetic difference between a numerically minimum monitored value in each said batch of said monitored values and a numerically maximum monitored value in that same batch, C. said optimum setpoint means includes first generating means selectively responsive to (ns) batch-range signals for generating said SIGXB signal, and D. said optimum setpoint means includes second generating means selectively responsive to (ns) batch-variance signals for generating said SIGXB signal.

8. An apparatus according to claim 7, comprising selection means for invoking, in accord with an average quantity of monitored values in said (ns) batches of monitored values, at least a selected one of said batch-variance means, said batch-range means, said first generating means and said second generating means.

9. An apparatus according to claim 8, wherein said selection means includes

A. means responsive to a numerical value of (ns) being less than or equal to ten for invoking said batch-range means and said first generating means, and B. means responsive to a numerical value of (ns) being greater than ten for invoking said batch-variance means and said second generating means 10. An apparatus according to any one of claims 2, 3, 5, and 7 wherein said optimum setpoint means comprises scaling means for generating a scaled variance signal representative of a multiplicative product of a value of said SIGXB signal and a selected scaling factor.

11. An apparatus according to claim 10, wherein said optimum setpoint means comprises summing means for generating said setpoint signal as a arithmetic sum of said scaled variance signal and a selected specification limit.

12. An apparatus according to claim 11, comprising means for receiving at least one of said selected scaling factor and said selected specification limit from an operator input device.

13. An apparatus according to claim 1, wherein said

A. monitoring means includes measuring means for measuring a value of said characteristic of said process to generate a signal representative thereof, and B. said optimum setpoint means includes sampling means, coupled to said measuring means, for forming said batch of monitored values by sampling said characteristic value-representative signal (n) times and for generating a signal representative thereof, where (n) is an integer greater than one.

14. An apparatus according to claim 13, wherein said sampling means comprises consecutive sample means for forming said batch of monitored values by sampling said (n) characteristic value representative signals beginning every (n) values.

15. An apparatus according to claim 14, wherein said sampling means comprises skip-m sample means for forming said batch of monitored values by sampling said (n) first characteristic value representative signals beginning every (n+m) values, where (m) is an integer greater than or equal to one.

16. An apparatus according to claim 1, further comprising

A. batch-mean means for generating a batch-mean signal representative of an arithmetic mean of a batch of said monitored values, B. XBB means for generating an XBB signal representative of an arithmetic average of arithmetic averages of a plurality of batches of monitored values, C. SIGXB means for generating a SIGXB signal representative of a standard deviation of arithmetic means of (ns) batches of monitored values, and D. rule means for detecting at least one of the following conditions and for generating an error signal in response thereto:

i) the most recent value of the batch-mean signal XB(j) is
  a) greater than a value of the XBB signal plus three times a value of the SIGXB signal, or
  b) less than a value of the XBB signal minus three times a value of the SIGXB signal, ii) starting with the most recent values of each of three consecutive the batch-mean signals, XB(j), vary from one another in either direction by an amount equal to or greater than a value of three times a value of the SIGXB signal, iii) starting with the most recent values of two of three consecutive the batch-mean signals, XB(j), are
  a) greater than a value of the XBB signal plus two times value of the SIGXB signal,
  b) less than a value of the XBB signal minus two times a value of the SIGXB signal, iv) starting with the most recent values of four of five consecutive the batch-mean signals, XB(j), are
  a) greater than a value of the XBB signal plus the value of the SIGXB signal,
  b) less than a value of the XBB signal minus the value of the SIGXB signal, v) starting with the most recent values of eight consecutive batch-mean signals, XB(j), are greater than a value of the XBB signal, vi) starting with the most recent values of eight consecutive batch-mean signals, XB(j), are less than a value of the XBB signal, vii) starting with the most recent values of five consecutive batch-mean signals, XB(j), are of increasing value, viii) starting with the most recent values of five consecutive batch-mean signals, XB(j), are of decreasing increasing value, ix) starting with the most recent values of fifteen consecutive batch-mean signals, XB(j), are
  a) less than a value of the XBB signal plus the value of the SIGXB signal, and b) less than a value of the XBB signal minus the value of the SIGXB signal, x) starting with the most recent values eight consecutive batch-mean signals, XB(j), are
   a) greater than a value of the XBB signal plus the value of the SIGXB signal,
   b) less than a value of the XBB signal minus the value of the SIGXB signal, xi) starting with the most recent value, after a value of a first batch-mean signal, XB(j), that varies from the previous XB signal, in either direction, by an amount greater than three times the value of the SIGXB signal, then values of three consecutive batch-mean signals, XB(j), are compared to check if they are
   a) greater than 0.75 times a value of the SIGXB signal minus a value of the previous batch-mean signal, and
   b) less than 0.75 times a value of the SIGXB signal plus a value of the previous first batch-mean signal, and E. said optimum setpoint means includes error-/bypass means responsive to said error signal for at least one of preventing generation of said setpoint signal and generating an operator alert signal for output on an operator output device.

17. An apparatus according to claim 1, wherein said optimum set point means comprises
A. normality means for generating a normality signal representative of a statistical normality measure of a batch of measured values, and
B. means coupled to said normality means for responding to a normality signal having a value outside a selected range for generating an error signal, and
C. error/bypass means responsive to said error signal for at least one of preventing generation of said setpoint signal and generating an operator alert signal for output on an operator output device.

18. An apparatus according to claim 17, wherein said normality means includes at least one of
A. skewness means for generating said normality signal as representative of a skewness of said batch of measured values, and
B. kurtosis means for generating said normality signal as representative of a kurtosis of said batch of measured values.

19. An apparatus according to claim 17, further comprising means for receiving said selected range from an operator input device.

20. An apparatus according to claim 1, wherein said controller means includes closed-loop control means, coupled to said process-performing equipment, for applying said controlled variable signal to said process-performing equipment.

21. A method for controlling a process performed with equipment that responds to a manipulated variable signal to vary a characteristic of that process, comprising the steps of
A. monitoring values of said characteristic of said process to generate a controlled variable signal representative thereof,
B. generating a setpoint signal representative of a desired setting of said process-performing equipment,
C. said setpoint-generating step including the step of generating each said setpoint signal in accord with a value of a standard deviation of arithmetic means of (ns) batches of said monitored process characteristic values identified by said controlled variable signals, each said batch a plurality of monitored values, where (ns) is an integer greater than one, and
D. responding at least to said setpoint signal for generating said manipulated variable signal for application to said process-performing equipment.

22. A method according to claim 21, wherein said setpoint generating step comprises
A. generating a statistical-characteristic signal representative of a statistical characteristic of each said batch of monitored values,
B. responding to statistical-characteristic signals of (ns) said batches of monitored values for generating a SIGXB signal representative of a standard deviation of arithmetic means of those (ns) batches.

23. A method according to claim 22, further comprising
A generating a batch-range signal representative of an arithmetic difference between a numerically minimum monitored value in each said batch of monitored values and a numerically maximum monitored value in that same batch, and
B. responding to (ns) ones of said batch-range signals for generating said SIGXB signal.

24. A method according to claim 23, further comprising generating said SIGXB signal in accord with the mathematical formula $$SIGXB = \frac{RB}{d2 * (n)^{\frac{1}{2}}}$$

where,
SIGXB represents a value of said SIGXB signal,
RB represents a numerical average of said plurality of range signals,
d2 represents a Shewhart value corresponding to (ns), and
n represents a quantity of said monitored values in each said batch of monitored values 25. A method according to claim 22, further comprising
A. generating a batch-variance signal representative of a standard deviation of the values in each said batch of monitored values, and
B. responding to (ns) ones of said batch-variance signals for generating said SIGXB signal.

26. A method according to claim 25, further comprising generating said SIGXB signal in accord with the mathematical expression $$SIGXB = \frac{SB}{c2 * (n)^{\frac{1}{2}} * (n/(n-1))^{\frac{1}{2}}}$$

where,
SIGXB represents a value of said SIGXB signal,
SB represents a numerical average of said (ns) batch-variance signals,
c2 represents a Shewhart value corresponding to (ns), and
n represents a quantity of said monitored values in each said batch of monitored values.

27. A method according to claim 22, further comprising

A. selectively generating a batch-variance signal representative of a standard deviation of values in each said batch of monitored values, B. selectively generating a batch-range signal representative of an arithmetic difference between a numerically minimum monitored value in each batch of said monitored values and a numerically maximum monitored value in that same batch, C. selectively responding to (ns) batch-variance signals for generating said SIGXB signal, and D. selectively responding to (ns) batch-range signals for generating said SIGXB signal.

28. A method according to claim 27, further comprising selectively executing, in accord with a quantity of monitored values in said batch, at least a selected one of said batch-variance signal generating step, said batch-range signal generating step, said batch-variance signal responding step, and said batch-range signal responding step.

29. A method according to claim 28, further comprising

A. responding to a numerical value of (n) being less than or equal to ten for executing said batch-range generating and said batch-range responding steps, and B. responding to a numerical value of (ns) being greater than ten for executing said batch-variance generating and said batch-variance signal responding steps.

30. A method according to any one of claims 22, 23, 25, and 27, comprising generating a scaled variance signal representative of a multiplicative product of a value of said SIGXB signal and a selected scaling factor.

31. A method according to claim 30, further generating said setpoint signal as a arithmetic sum of said scaled variance signal and a selected specification limit.

32. A method according to claim 31, further comprising receiving at least one of said selected scaling factor and said selected specification limit from an operator input device.

33. A method according to claim 21, further comprising

A. measuring a value of said characteristic of said process to generate a signal representative thereof, and B. forming a batch of monitored values by sampling said characteristic value-representative signal (n) times and for generating a signal representative thereof, where (n) is an integer greater than one.

34. A method according to claim 33, further comprising forming said batch of monitored values by sampling said (n) characteristic value-representative signals beginning every (n) values.

35. A method according to claim 34, further comprising forming said batch of monitored values by sampling said (n) first characteristic value-representative signals beginning every (n+m) values, where (m) is an integer greater than or equal to one.

36. A method according to claim 21, further comprising

A. generating a batch-mean signal representative of an arithmetic mean of a batch of said monitored values, B. generating an XBB signal representative of an arithmetic average of arithmetic averages of a plurality of batches of monitored values, C. generating a SIGXB signal representative of a standard deviation of arithmetic means of (ns) batches of monitored values, D. detecting at least one of the following conditions and for generating an alarm signal in response thereto:

i) the most recent value of the batch-mean signal XB(j) is
   a) greater than a value of the XBB signal plus three times a value of the SIGXB signal, or
   b) less than a value of the XBB signal minus three times a value of the SIGXB signal, ii) starting with the most recent values of each of three consecutive the batch-mean signals, XB(j), vary from one another in either direction by an amount equal to or greater than a value of three times a value of the SIGXB signal, iii) starting with the most recent values of two of three consecutive the batch-mean signals, XB(j), are
   a) greater than a value of the XBB signal plus two times value of the SIGXB signal,
   b) less than a value of the XBB signal minus two times a value of the SIGXB signal, iv) starting with the most recent values of four of five consecutive the batch-mean signals, XB(j), are
   a) greater than a value of the XBB signal plus the value of the SIGXB signal,
   b) less than a value of the XBB signal minus the value of the SIGXB signal, v) starting with the most recent values of eight consecutive batch-mean signals, XB(j), are greater than a value of the XBB signal, vi) starting with the most recent values of eight consecutive batch-mean signals, XB(j), are less than a value of the XBB signal, vii) starting with the most recent values of five consecutive batch-mean signals, XB(j), are of increasing value, viii) starting with the most recent values of five consecutive batch-mean signals, XB(j), are of decreasing increasing value, ix) starting with the most recent values of fifteen consecutive batch-mean signals, XB(j), are
   a) less than a value of the XBB signal plus the value of the SIGXB signal, and
   b) less than a value of the XBB signal minus the value of the SIGXB signal, x) starting with the most recent values of eight consecutive batch-mean signals, XB(j), are
   a) greater than a value of the XBB signal plus the value of the SIGXB signal,
   b) less than a value of the XBB signal minus the value of the SIGXB signal, xi) starting with the most recent value, after a value of a first batch-mean signal, XB(j), that varies from the previous XB signal, in either direction, by an amount greater than three times the value of the SIGXB signal, then values of three consecutive batch-mean signals, XB(j), are compared to check if they are
   a) greater than 0.75 times a value of the SIGXB signal minus a value of the previous batch-mean signal, and
   b) less than 0.75 times a value of the SIGXB signal plus a value of the previous first batch-mean signal, and E. responding to said error signal for at least one of preventing generation of said setpoint signal and generating an operator alert signal for output on an operator output device.

37. A method according to claim 21, further comprising
  A. generating a normality signal representative of a statistical normality measure of a batch of measured values, and
  B. responding to a normality signal having a value outside a selected range for generating an error signal, and
  C. responding to said error signal for at least one of preventing generation of said setpoint signal and generating an operator alert signal for output on an operator output device.

38. A method according to claim 37, further comprising at least one of the steps of
  A. generating said normality signal as representative of a skewness of said batch of measured values, and
  B. generating said normality signal as representative of a kurtosis of said batch of measured values.

39. A method according to claim 37, further comprising receiving said selected range from an operator input device.

40. A method according to claim 21, further comprising applying said controlled variable signal to said process-performing equipment.

41. In an apparatus for controlling a process performed with equipment that responds to a manipulated variable signal to vary a characteristic of that process, wherein said apparatus includes means for monitoring values of said characteristic of said process to generate a controlled variable signal representative thereof, and further includes controller means for responding to a setpoint signal for generating said manipulated variable signal for application to said process-performing equipment, the improvement comprising
  A. optimum setpoint means coupled to said monitoring means for generating a setpoint signal representative of a desired setting of said process-performing equipment, and
  B. said optimum setpoint means including means for generating each said setpoint signal in accord wtih a value of a standard deviation of arithmetic means of (ns) batches of said monitored process characteristic values identified by said controlled variable signals, where each said batch includes a plurality of monitored values, and where (ns) is an integer greater than one.

42. An optimum setpoint control apparatus for controlling process-performing equipment that responds to a manipulated variable signal to vary a characteristic of that process and that includes monitoring means for monitoring values of said characteristic of said process to generate a controlled variable signal representative thereof, said optimum setpoint control apparatus comprising:
  A. optimum setpoint means coupled to said monitoring means for generating at least one setpoint signal representative of a desired setting of said process-performing equipment,
  B. said optimum setpoint means including means for generating each said setpoint signal in accord wtih a value of a standard deviation of arithmetic means of (ns) batches of said monitored process characteristic values identified by said controlled variable signals, where each said batch includes a plurality of monitored values, and where (ns) is an integer greater than one, and
  C. controller means, coupled to said optimum setpoint means, for responding to said setpoint signal for generating said manipulated variable signal for application to said process-performing equipment.

43. An apparatus according to claim 42, wherein said optimum setpoint means comprises
  A. batch-characteristic means for generating a statistical-characteristic signal representative of a statistical characteristic of each said batch of monitored values, and
  B. SIGXB means, coupled to said batch-characteristic means, for responding to statistical-characteristic signals of (ns) said batches of monitored values to generate a SIGXB signal representative of a standard deviation of arithmetic means of those (ns) batches.

44. An apparatus according to claim 42, wherein said optimum setpoint means comprises
  sampling means, coupled to said measuring means, for forming said batch of monitored values by sampling said characteristic value-representative signal (n) times and for generating a signal representative thereof, where (n) is an integer greater than one.

45. An apparatus according to claim 42, wherein said optimum set point means comprises
  A. normality means for generating a normality signal representative of a statistical normality measure of a batch of measured values, and
  B. means coupled to said normality means for responding to a normality signal having a value outside a selected range for generating an error signal, and
  C. error/bypass means responsive to said error signal for at least one of preventing generation of said setpoint signal and generating an operator alert signal for output on an operator output device.

* * * * *